(12) United States Patent
Wong

(10) Patent No.: US 7,587,458 B2
(45) Date of Patent: Sep. 8, 2009

(54) DELTA CODE MESSAGING

(75) Inventor: Lawrence Wong, Purley (GB)

(73) Assignee: Nokia Corporation, Espoo (FI)

( * ) Notice: Subject to any disclaimer, the term of this patent is extended or adjusted under 35 U.S.C. 154(b) by 573 days.

(21) Appl. No.: 11/289,993

(22) Filed: Nov. 30, 2005

(65) Prior Publication Data

US 2007/0005807 A1    Jan. 4, 2007

(30) Foreign Application Priority Data

Jun. 29, 2005    (GB)    ................... 0513317.8

(51) Int. Cl.
G06F 15/16 (2006.01)
(52) U.S. Cl. ................... 709/206; 709/203; 709/223
(58) Field of Classification Search ................. 709/206, 709/203, 217, 223, 224, 247
See application file for complete search history.

(56) References Cited

U.S. PATENT DOCUMENTS

| | | | | |
|---|---|---|---|---|
| 5,091,945 | A * | 2/1992 | Kleijn | 704/219 |
| 5,566,001 | A * | 10/1996 | Saidi et al. | 358/426.02 |
| 5,691,717 | A | 11/1997 | Tamura | |
| 5,764,899 | A * | 6/1998 | Eggleston et al. | 709/203 |
| 5,991,713 | A | 11/1999 | Unger et al. | |
| 6,101,531 | A * | 8/2000 | Eggleston et al. | 709/206 |
| 6,112,244 | A * | 8/2000 | Moore et al. | 709/228 |
| 6,772,126 | B1 * | 8/2004 | Simpson et al. | 704/500 |
| 7,348,904 | B2 * | 3/2008 | Christoffersson et al. | 341/106 |
| 7,412,541 | B1 * | 8/2008 | Stadler et al. | 709/247 |
| 2003/0233478 | A1 * | 12/2003 | Chuah et al. | 709/247 |
| 2005/0185677 | A1 * | 8/2005 | Christoffersson et al. | 370/521 |
| 2006/0239221 | A1 * | 10/2006 | Burns et al. | 370/328 |
| 2007/0016414 | A1 * | 1/2007 | Mehrotra et al. | 704/230 |
| 2008/0037509 | A1 * | 2/2008 | Foti | 370/349 |
| 2008/0147801 | A1 * | 6/2008 | Foti | 709/206 |

FOREIGN PATENT DOCUMENTS

| | | |
|---|---|---|
| EP | 1 376 878 | 1/2004 |
| JP | 07064765 | 3/1995 |
| JP | 2000269822 | 9/2000 |

OTHER PUBLICATIONS

UK Search Report, dated Mar. 2, 2006, issued in corresponding GB Application No. GB0513317.

* cited by examiner

Primary Examiner—Lashonda T Jacobs
(74) Attorney, Agent, or Firm—Saul Ewing LLP

(57) ABSTRACT

A method of communication of digital messages with improved efficiency through the use of the transfer of difference data between devices. In one aspect of the invention, the difference data communicated is between different generations of a derived message sequence such as an email thread. In another aspect of the invention, the messages are encoded by means of a codebook, and the difference data communicated is between different versions of the codebook. In this second aspect of the invention, the codebooks may automatically utilize the difference data to adapt their efficiency, and the codebooks may be automatically customized for specific individuals or groups.

12 Claims, 4 Drawing Sheets

DELTA CODE MESSAGING

CROSS REFERENCE TO RELATED APPLICATIONS

This application claims the priority of GB 0513317.8 filed Jun. 19, 2005.

FIELD OF THE INVENTION

This invention relates to a method of improving the efficiency of the bandwidth used for the communication of messages, and in particular to a method for providing improvements in the efficiency of bandwidth used in the communication of messages by the use and transportation of difference data.

BACKGROUND ART

Digital data communications over telephone networks have traditionally been associated with data compression technologies. One reason why these technologies have been used is that this type of communications bandwidth has historically tended to be either expensive or scarce, or both expensive and scarce. Another reason is the relative unreliability of telephone networks and their tendency to introduce extraneous data, since the compression methods used with digital data often incorporates error detection and/or error correction mechanisms. Examples of data compression and error detection/correction protocols from the International Telecommunications Union (ITU) designed for use with telephone networks include the T.4 method of compressing image data, still used today in facsimile machines, and dial-up modem protocols such as V.42bis.

While the increasing use of broadband data networks has led to a diminution of the use of fixed telephone networks for data communication, there has at the same time been an increase in the use of wireless telephony for this purpose. The success of the GSM Short Message Service (SMS), with over 1000 billion text messages projected to be sent during 2005, is the most dramatic evidence of this, while the use of wireless telephones as terminals to more conventional electronic mail (email) systems is also growing fast, albeit less dramatically.

Although the description of this invention mostly discusses its applicability to email, it should be understood that it applies equally well to the transportation of any type of digital message between any type of computing device. The term computing device as used in this content should be understood to apply to any entity with a processor and memory storage which is capable of sending, receiving or processing digital messages. This includes but is not limited to personal computers of all types, network servers, terminals, mobile or fixed line telephones, pagers, and any converged devices capable of connecting to computer networks such as games machines.

In general, email messages and their attachments are treated by wireless terminals and wireless networks in the same way as they are on fixed networks, with content being transported over-the-air between the mail servers and their mobile clients "as is". This means that when transporting messages, the entire contents of the message would normally be sent. So, for example, the common use case of someone forwarding a message and just adding the text "FYI" at the top would require the original message to be completely re-transmitted in addition to the minimal new text "FYI".

It is recognised that this is not always an efficient use of network bandwidth, because forwarding and replying to emails very commonly leads to the development of long chains or threads.

A somewhat more efficient method of sending this type of email over wireless telephone networks has been pioneered by the Blackberry wireless email terminals manufactured by Research in Motion Ltd of Ontario, Canada (RIM). Users of Blackberry devices do not need to retransmit the original of a message received from their handsets when they want to include it in a reply, or when it is forwarded. Instead, they can send a command token with a unique message identifier corresponding to the original message as part of their new message transmitted to the Blackberry mail server. The mail server then retrieves the text of the original message and inserts the new message at the relevant point. This facility aims to minimise the bandwidth used and costs incurred by re-transmission or forwarding of emails and attachments.

The data compression technologies described above are not, however, optimised for typical use cases involving the sending and receiving of emails via scarce or expensive transport mechanisms. The cellular wireless links available to mobile telephones are currently one of the most prominent examples of such mechanisms.

Traditionally, data compression technology relies on some form of data dictionary which is transported over the data link together with the data being compressed; in the case of ITU V.42bis, this is done on a session by session basis. However, the transportation of the dictionary represents a significant overhead for low volumes of data where there is very little chance that significant data elements will be repeated a large number of times; this is the typical scenario of someone reading one or two emails on their mobile phone. As the data content changes, such dictionaries either become ineffective or else need to be updated, which can result in the consumption of still more bandwidth, yielding little or no net advantage. These problems may account for that fact that very few GSM operators have enabled V.42bis data compression on their CSD (circuit-switched data) networks.

The RIM Blackberry command token system, though capable of handling basic reply and forwarding scenarios such the "FYI" content case outlined above, does not deal very efficiently with cases where the recipient of an email modifies the text before replying or forwarding it onto another user. A familiar modification of this type is that commonly used in Unix style mail clients, where the text of an original message is included with a reply, but with each line prefixed with a special character indicating that it is a quote from the original; the usual character for this is the right-hand angle bracket ">".

Furthermore, in the case of all such mechanisms that rely on message IDs (such as the Blackberry) the original message must always be completely sent from the server to the mobile client at least once, as otherwise there would be no meaning that could be attached to a message ID, preventing the handling of email replies or forwarding via command tokens.

SUMMARY OF THE INVENTION

Therefore, it is an object of the present invention to at least alleviate the problems outlined above through the use of differencing technology in the transmission of email and other forms of messaging data. Like other forms of compression technology, this trades off one resource (computing overhead) which, increasingly, is considered inexpensive and plentiful against another resource (bandwidth) which is considered expensive and scarce.

According to a first aspect of the present invention there is provided a method of transmitting a digital message from a first computing device to a second computing device by means of the first device identifying a data set that can be associated with a digital message which is stored on both the first and second devices;

the first device generating a modified version of the said data set;

the first device generating a set of difference information from a comparison between the modified data set and the original data set;

the first device transmitting the said difference information together with supplementary data; and the second device using the difference information and the supplementary data in combination with its copy of the data set to reproduce the digital message.

According to a second aspect of the present invention there is provided a computing device arranged to operate in accordance with the method of the first aspect.

According to a third aspect of the present invention there is provided an operating system for causing a computing device to operate in accordance with the method of the first aspect.

DETAILED DESCRIPTION

Figure 1:
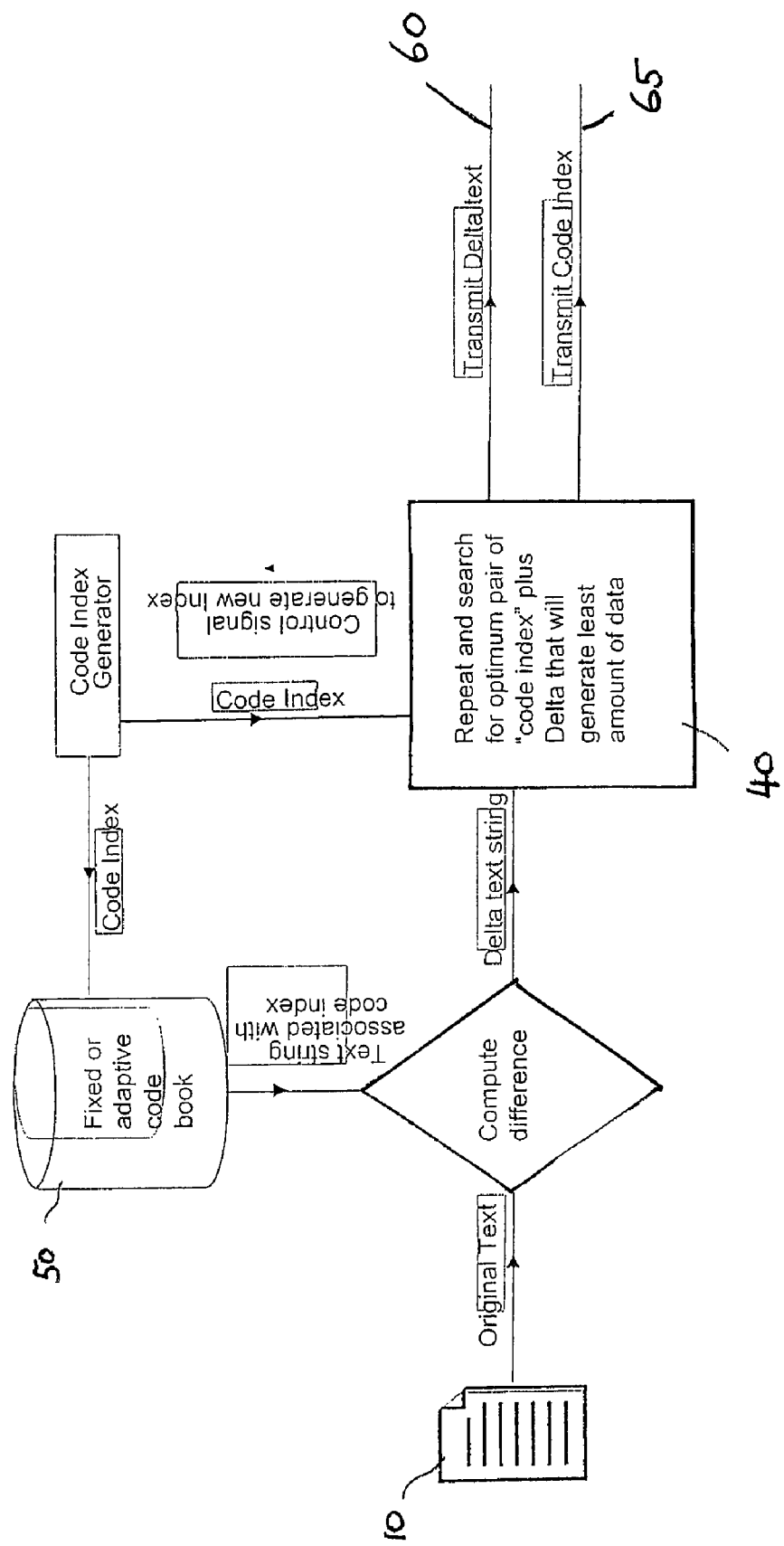
FIG. 1 is a schematic diagram of a messaging server according to the preferred embodiment of the invention.
Figure 2:
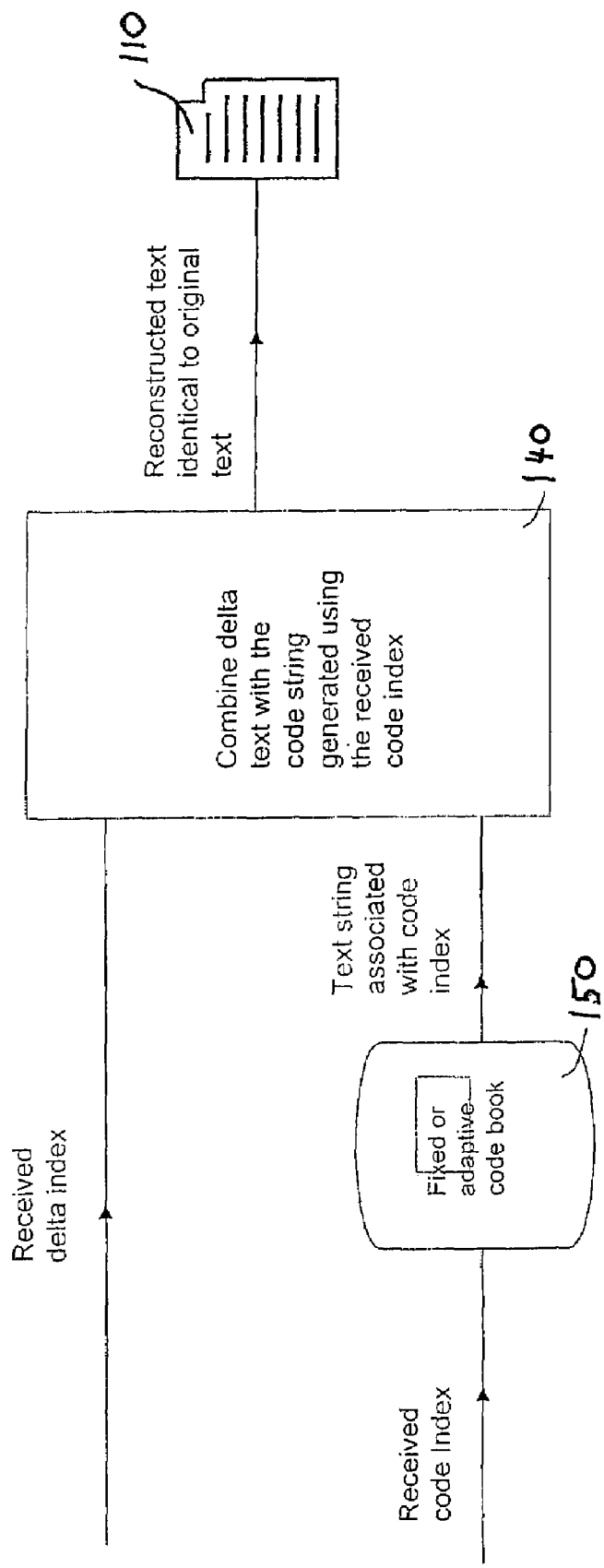
FIG. 2 is a schematic diagram of a messaging client of the messaging server shown in FIG. 1 according to the preferred embodiment of the invention.

Embodiments of the present invention will now be described, by way of further example only.

In the area of file transfer, the application of differencing technology is a well-established method of reducing the volume of transmitted data by sending only the differences between new and old versions of a document, thereby enabling a recipient in possession of the old version to reconstruct the new version. Differencing technology has also been applied to other areas of computing, such as source code management and data backup. However, it has not hitherto been applied to email or messaging.

A first embodiment of the present invention relates to the application of differencing technology when replying to or forwarding emails. The benefit of this is that instead of transmitting the whole email 10 back to the server, it is only necessary for the sending client to transmit the differences (also known as delta information) together with a message identifier (ID) enables the original email to be identified. By using the delta information and the original email 10 stored on the server, the server is able reconstruct the email message created on the client device thereby achieving the desired transmission more quickly whilst also saving transmission bandwidth and expense. This reconstructed email can then be sent over the Internet in the usual manner; the only noticeable effect of this invention at the transmitting end is that the sender may notice that the mail was transmitted rather more quickly than usual. The fact that the mail is actually sent in the form of delta information and then reconstructed is of course completely transparent to any recipients.

It is also possible with this invention for an email to be transmitted in the form of delta information to the recipient. It is known that when first logging on to an electronic mailbox to look for an incoming message, a recipient will initially be presented, not with the whole message, but with an abbreviated indication of the content of the message. In the case of mail servers accessed using Internet protocols such as POP3 and IMAP this abbreviated indicator will consist simply of the message header. BlackBerry™ servers in addition usually transmit the beginning of the actual message. In either case, the abbreviated message indicator is intended to let the recipient decide whether or not he/she wishes to download and read the entire message.

With the present invention it has been realized that the mail server, when transmitting the message, can also include in the header a field containing one (or more) message IDs in case the recipient happens to have an earlier message in the thread stored on their device. If a recipient does not have a message corresponding to one of the message IDs available, he/she can just ignore that item of information. However, if a recipient does have a message corresponding to a message ID included in the header, he/she can request the server to transmit only the differences between that stored message and the newly received message; which once again saves time, bandwidth and expense. The reconstruction of the message by the recipient can take place before it is stored, with the reconstructed message being stored. However, it may be preferable, if the original is guaranteed to be available when needed, to store just the differences between that stored message and the newly received message and for the reconstruction to take place on the fly while the message is being displayed. This saves internal storage on the recipient device, and on a resource constrained device such as a mobile telephone, conservation of memory is always an important consideration.

A second embodiment of this invention addresses the concern that the application of differencing technology only works for replies or forwarded mail, as there is no benefit in the application of differencing technology if there is no original message that the differences can be applied to. Differencing always requires a reference data source for a server or a recipient to be able to reconstruct the original data using the delta information; this has been interpreted as meaning that there are no bandwidth, time or expense savings associated applying differencing technology to any original message; these have always been considered as being required to be transmitted and received in their entirety.

However, by means of the introduction of a standard codebook 50, which is kept on both the mail server and its clients, it is possible to send data that has been substantially compressed by replacing textual elements such as words or phrases with code vectors 65 that point to those elements in the codebook 50 together with a set of delta information 60 detailing any deviation from text strings available in the codebook. This method is different to the type of data dictionary used in compression techniques such as ITU V.42bis; whereas the data dictionary in that method needs to be included with data being compressed, the standard codebook with this embodiment does not need to be included in this way as it is already resident.

This use of a standard codebook to compress data might be considered to have some points of similarity with the CELP (Codebook Excitation Linear Prediction) techniques used in voice encoding. However, all such speech compression methods are lossy, which means that an exact copy of the original can never be generated from the compressed version because there is always a loss of information during the compression process. But, in the case of speech, a reconstruction that is an inexact but close copy of the original is usually considered sufficient both to enable human listeners to extract the information and recognise the speaker. However, a lossy compression technique that gives rise to losses in the regenerated uncompressed data would not be considered as applicable for text based data or any binary data, because their usefulness for these types of data depends on a high degree of redundancy in the original. The use of the technique for speech data is therefore in strict contrast to the use of the codebook technique for text based or digital data, as proposed by the present invention.

In strict contrast to CELP, the method used in this invention is lossless; this means that an exact reconstruction of the original information can always be obtained from the compressed information. This is because the standard codebook 50 is supplemented by delta information 60 giving the differences that need to be applied to the standard codebook in order to reproduce an exact copy 110 of the information. The application of differencing technology to the fixed information in a previously lossy compression technique therefore enables a lossless compression technique to be provided for text based data.

It should be noted that this invention is not concerned with the design and implementation of any of the codebooks needed for its implementation; this is a separate field of technology with its own specialists. To be efficient, any such codebooks may need to be specific to a particular language, dialect, or specific to a set of subjects or a group of people. Techniques and the requirements for the generation of such codebooks will therefore be apparent to the person skilled in this art, and they will not be described further in the context of the present invention.

It is also envisaged for multiple codebooks to be available both on a device and on the messaging servers. Choosing an inappropriate codebook will almost certainly result in poor compression ratios and larger amounts of delta information; achieving the best compression ratios is therefore dependent on choosing the correct or most appropriate codebook. Consequently, this invention can be enhanced to make use of multiple available codebooks by means of the addition of mechanisms which can select the best codebook at the start of a message (such as by interpreting fields in the header, for example) and/or also by the addition of mechanisms (such as escape sequences embedded in the message) which automate the switch over between one or more of the available codebooks should it be determined that the use of a different codebook would be more efficient. The discovery of the list of available codebooks on any messaging client can be determined through extensions to existing mechanisms, such as the Session Initiation Protocol (SIP).

A third embodiment of this invention provides further improvements to the data compression by providing the standard code book 50 with the ability to adapt to the text commonly sent and received by the user of the client messaging device and therefore become more efficient with use. For instance, it is advantageous for a user to have frequently occurring personal items such as their name in the codebook. The exact mechanism for achieving such dynamic adaptation is not part of this invention, as there are existing techniques for achieving this, such as those provided with predictive text applications. For an example, see the description of T9 provided at http://www.t9.com/.

It is however apparent that simply using existing techniques for adapting the standard codebook on the client device 40 alone would not be a fruitless exercise, as the use of codebooks depends on their availability on more than one device; if this is not possible, then encoded material cannot be decoded.

Therefore this invention also envisages the application of differencing technology to synchronise an adapted codebook between the client device and the messaging server. The transmission by the client to the server of the information needed to reconcile the codebook at the server with the state of the codebook on the client can be handled during the course of normal data exchanges by a number of methods. For instance, tokens or escape codes can be embedded in the normal delta information; so the transmission of a single text string in the delta information can be prefixed with a token or escape code indicating that the following n characters should be added to the codebook. Alternatively, any of the code vectors that point to data that needs to be added to the codebook can have unambiguous tags attached. Other methods of indicating data that needs to be tagged will be apparent to those skilled in the art. The exchange of some type of unique hash derived from the entire codebook can then be used to verify that the delta information has been applied correctly to the codebook at the server.

Once the codebooks are synchronised, the transmission efficiency is greatly improved in comparison to that achieved without an adapted codebook; the fact that the codebook is optimized to include commonly used text that was previously omitted means that less delta information is required to be transmitted for each message, and less bandwidth is needed.

While the messaging server may keep a separate copy of the codebook used as adapted for each of its clients, it is more efficient for it to maintain a single copy of the standard codebook for all clients, and then keep a set of delta information for each client that consists of the cumulative series of the deltas it has transmitted. A temporary codebook can then be generated for each client on a per-session information basis by applying the cumulative series to the standard codebook. Again, an exchange of hash information can be included in the session log-on or preamble as a means of verification that the difference data has been correctly applied. In case of error, the fallback position is to revert to the standard codebook.

An optimisation of this invention is the extension of the concept of an adaptive codebook to a group of clients rather than an individual client. The evolution of the standard codebook to include new words or phrases which arise can then be automatically forwarded to all members of the group. When a new client joins the group, the entire set of differences can then be applied on his/her device, giving instant efficiency gains.

Typical applications of this optimisation would be a codebook adapted to be used with all the employees of a company, or all the supporters of a football team; in both bases, there are words and phrases which are more likely to be common to all members of the group that are not widely used outside.

It can be seen from the above description that several advantages accrue through the use of the present invention:

The novel application of difference technology to messaging dramatically cuts down the required bandwidth.

Codebook compression combined with differencing is a very powerful compression technique for the transport of messaging; it also means that it is not necessary to send even original messages in their entirety.

Figure 3:
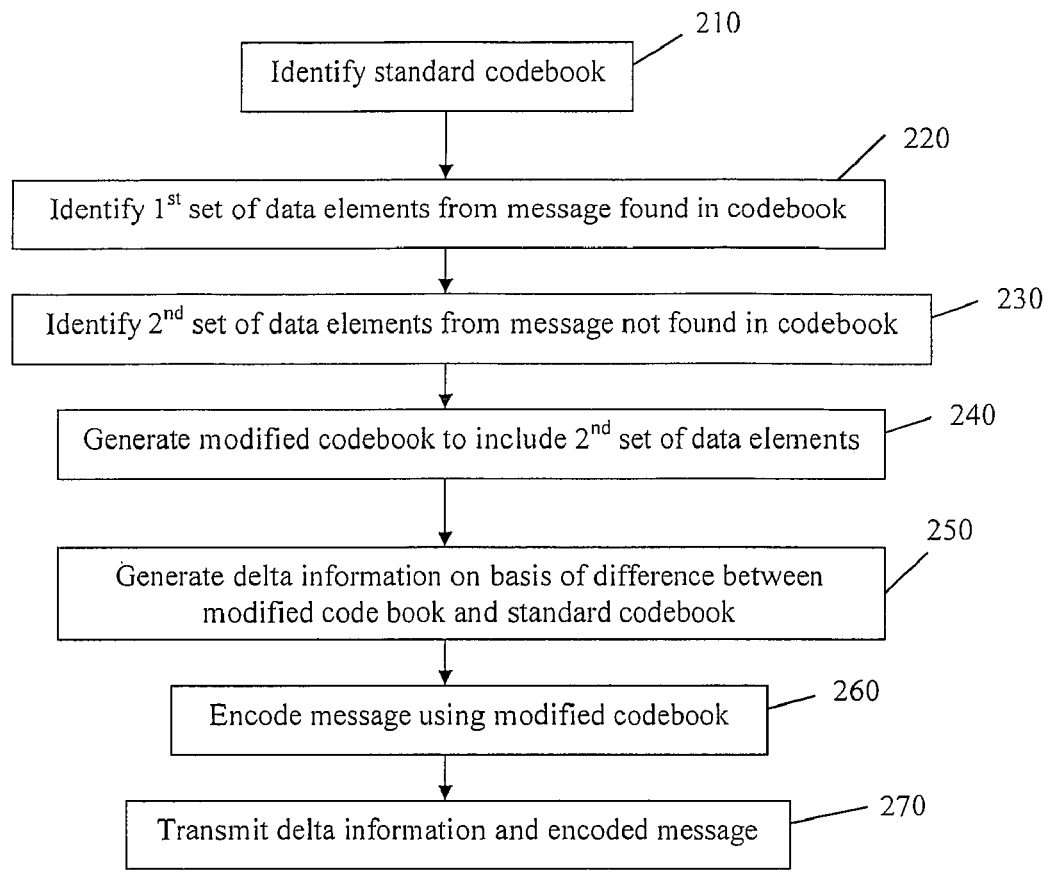
FIG. 3 is a flowchart illustrating steps performed according to an embodiment of the claimed invention.
Figure 4:
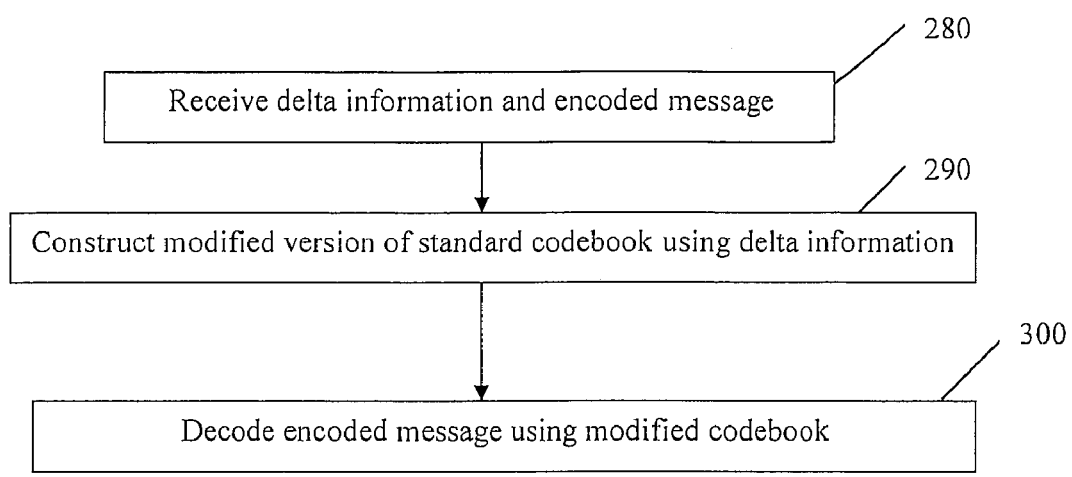
FIG. 4 is a flowchart illustrating steps performed according to an embodiment of the claimed invention.

Accordingly, as illustrated in FIGS. 3 and 4, one embodiment of the present invention comprises a method of transmitting a digital message from a first computing device to a second computing device by means of the first device identifying a data set that can be associated with a digital message which is stored on both the first and second devices (210-

230); the first device generating a modified version of the said data set (240); the first device generating a set of difference information from a comparison between the modified data set and the original data set (250); the first device transmitting the said difference information together with supplementary data; and the second device using the difference information and the supplementary data in combination with its copy of the data set to reproduce the digital message (260, 270). One of the computing devices can be selected to comprise a messaging electronic mail server; and the other computing device can be selected to comprise a messaging client of the said server. Further, the digital message can be an email; the identified data set can be a standard codebook; and the first computing device can identify a first set of data elements found in the digital message email which are found in the standard codebook (220); identify a second set of data elements found in the digital message email which are not found in the standard codebook but which could be more efficiently represented if they had been found (230); construct an extended codebook which includes the second set of data elements (240, 290); and replace both the first and the second sets of data elements with code vectors pointing to the identical data elements in the temporary extended codebook; the modified version of the data set being the extended codebook used to encode the digital message; the supplementary data including the encoded email digital message; and the second computing device, on receiving the difference data constructing a temporary extended codebook by applying the set of differences to the standard codebook; and replacing all code vectors in the encoded digital message email included with the supplementary data with the corresponding data elements from the extended codebook (300).

Adaptive codebook compression coupled with differencing provides additional compression benefits because the standard codebook can be modified during use to maximise its efficiency for individual users.

The advantages for clients of email services and subscribers to mobile data services in particular are lower costs and faster and more reliable transmission.

There are benefits to network operators and service providers, particularly when flat-rate "all you can use" services are offered, such as, for example, when using push email. The more efficient use of network bandwidth allows more simultaneous users to have a good user experience.

Although the present invention has been described with reference to particular embodiments, it will be appreciated that modifications may be effected whilst remaining within the scope of the present invention as defined by the appended claims.

The invention claimed is:

1. A method of transmitting a digital message from a first computing device to a second computing device by means of
   a. the first device identifying a standard codebook that can be associated with a digital message, said standard codebook being stored on both the first and second devices;
   b. the first device identifying a first set of data elements found in the digital message which are found in the standard codebook;
   c. the first device identifying a second set of data elements found in the digital message which are not found in the standard codebook but which could be more efficiently represented if they had been found;
   d. the first device generating a modified version of the said standard codebook including the second set of data elements;
   e. the first device generating a set of difference information from a comparison between the modified version of the standard codebook and the original standard codebook;
   f. the first device encoding the digital message by replacing both the first and the second sets of data elements with code vectors pointing to the identical data elements in the modified version of the codebook;
   g. the first device transmitting the said difference information together with supplementary data, said supplementary data including at least the encoded digital message; and
   h. the second device, on receiving the difference information and the supplementary data:
      i. constructing a modified version of the codebook by applying the set of differences to its copy of the standard codebook; and
      ii. replacing all code vectors in the encoded digital message with the corresponding data elements from the modified version of the codebook to reproduce the original digital message.

2. A method according to claim 1 wherein
   a. one of the computing devices is selected to comprise a messaging electronic mail server; and
   b. the other computing device is selected to comprise a messaging client of the said server.

3. A method according to claim 1 as applied to a set of messages.

4. A method according to claim 1 as applied either to binary or to text messages.

5. A method according to claim 1 wherein
   a. more that one codebook is common to the first and second computing devices;
   b. the first computing device is able to determine the most efficient codebook to use;
   c. the first computing device includes a unique identifier for the codebook used for the supplementary data; and
   d. the second computing device identifies the codebook to use from the supplementary data.

6. A method according to claim 5 wherein a mechanism such as the Session Initiation Protocol is used to determine the codebooks common between itself and the second computing device.

7. A method according to claim 1 wherein
   a. the first computing device identifies a further set of data elements that, over a number of iterations of the method, frequently appear in the aforementioned second set of data elements;
   b. the first computing device communicates data elements of the said further set to the second computing device, by means including but not limited to
      i. tagging those data elements in the temporary extended codebook; or
      ii. tagging code vectors that point to them; and
   c. both the first and the second computing devices extend the standard codebook by adding the further set of data elements.

8. A method according to claim 7 wherein a messaging server keeps difference data specific to certain of its clients that can be applied to a standard codebook in order to generate an extended version of the said standard codebook for use with each of those clients.

9. A method according to claim 7 wherein a messaging mail server keeps difference data for groups of its clients that can be applied to a standard codebook in order to generate an extended version of the said standard codebook for use with members of that group.

10. A method according to claim 7 wherein the first and second computing devices exchange hashes of the extended codebook in order to confirm conformity of the extended codebooks.

11. A computing device comprising:
a first computing device;
identifying a standard codebook that can be associated with a digital message, said standard codebook being stored on both the first and second devices;
identifying a first set of data elements found in the digital message which are found in the standard codebook;
identifying a second set of data elements found in the digital message which are not found in the standard codebook but which could be more efficiently represented if they had been found;
generating a modified version of the said standard codebook including the second set of data elements;
generating a set of difference information from a comparison between the modified version of the standard codebook and the original standard codebook;
encoding the digital message by replacing both the first and the second sets of data elements with code vectors pointing to the identical data elements in the modified version of the codebook;
transmitting the said difference information together with supplementary data, said supplementary data including at least the encoded digital message; and
a second device, on receiving the difference information and the supplementary data;
constructing a modified version of the codebook by applying the set of differences to its copy of the standard codebook; and
replacing all code vectors in the encoded digital message with the corresponding data elements from the modified version of the codebook to reproduce the original digital message.

12. An operating system comprising a computer program product for causing the transmission of a digital message from a first computing device to a second computing device, comprising:
a computer-readable media;
a first set of program instructions to:
identify a standard codebook that can be associated with a digital message, said standard codebook being stored on both the first and second devices;
identify a first set of data elements found in the digital message which are found in the standard codebook;
identify a second set of data elements found in the digital message which are not found in the standard codebook but which could be more efficiently represented if they had been found;
generate a modified version of the said standard codebook including the second set of data elements;
generate a set of difference information from a comparison between the modified version of the standard codebook and the original standard codebook;
encode the digital message by replacing both the first and the second sets of data elements with code vectors pointing to the identical data elements in the modified version of the codebook;
transmit the said difference information together with supplementary data, said supplementary data including at least the encoded digital message; and
a second set of program instructions to:
receive the difference information and the supplementary data:
construct a modified version of the codebook by applying the set of differences to its copy of the standard codebook; and
replace all code vectors in the encoded digital message with the corresponding data elements from the modified version of the codebook to reproduce the original digital message and
wherein said first and second program instructions are stored on said computer readable media.

* * * * *